United States Patent
Falk

(10) Patent No.: US 8,989,386 B2
(45) Date of Patent: Mar. 24, 2015

(54) METHOD AND DEVICE FOR PROVIDING AT LEAST ONE SECURE CRYPTOGRAPHIC KEY

(75) Inventor: Rainer Falk, Poing (DE)

(73) Assignee: Siemens Aktiengesellschaft, Munich (DE)

( * ) Notice: Subject to any disclaimer, the term of this patent is extended or adjusted under 35 U.S.C. 154(b) by 129 days.

(21) Appl. No.: 13/635,523

(22) PCT Filed: Feb. 14, 2011

(86) PCT No.: PCT/EP2011/052097
§ 371 (c)(1),
(2), (4) Date: Sep. 17, 2012

(87) PCT Pub. No.: WO2011/113651
PCT Pub. Date: Sep. 22, 2011

(65) Prior Publication Data
US 2013/0010965 A1    Jan. 10, 2013

(30) Foreign Application Priority Data
Mar. 17, 2010   (DE) .......................... 10 2010 011 657

(51) Int. Cl.
*H04L 9/16* (2006.01)
*H04L 9/08* (2006.01)
(Continued)

(52) U.S. Cl.
CPC ................. *H04L 9/0891* (2013.01); *H04L 9/32* (2013.01); *H04L 9/08* (2013.01); *G05B 19/0428* (2013.01); *G05B 2219/36542* (2013.01)
USPC ............. 380/277; 380/278; 380/279; 726/17; 726/21; 726/27

(58) Field of Classification Search
CPC ........... H04L 9/0891; H04L 9/08; H04L 9/32; G05B 19/0428; G05B 2219/36542
USPC .......................................................... 380/277
See application file for complete search history.

(56) References Cited

U.S. PATENT DOCUMENTS

| 6,965,992 B1 * | 11/2005 | Joseph et al. ................. 713/153 |
| 2002/0172358 A1 | 11/2002 | Hurich ............................. 380/37 |
| 2009/0245522 A1 | 10/2009 | Kudo et al. .................... 380/280 |

(Continued)

FOREIGN PATENT DOCUMENTS

| DE | 10110049 A1 | 9/2002 | ........... G05B 19/042 |
| EP | 1763169 A1 | 3/2007 | ................ H04L 9/06 |

(Continued)

OTHER PUBLICATIONS

International Search Report and Written Opinion, Application No. PCT/EP2011/052097, 19 pages, May 26, 2011.

*Primary Examiner* — Kaveh Abrishamkar
*Assistant Examiner* — Ayoub Alata
(74) *Attorney, Agent, or Firm* — King & Spalding L.L.P.

(57) ABSTRACT

A device is configured for providing at least one secure cryptographic key for performing a cryptographic security function using a control device which requires a cryptographic key therefor. A configured key provided for the security function is selected from a first configuration memory and is tested using the read configured key whether a secure replacement key associated with the read configured key is memorised in a second configuration memory, said replacement key is provided for the control device for performing the security function instead of the configure key.

17 Claims, 5 Drawing Sheets

(51) Int. Cl.
*G05B 19/042* (2006.01)
*H04L 9/32* (2006.01)

(56) References Cited

U.S. PATENT DOCUMENTS

2009/0300727 A1* 12/2009 Shioyama et al. ............... 726/4
2010/0174903 A1* 7/2010 Christophani ............... 713/168
2013/0010965 A1 1/2013 Falk ............................. 380/277

FOREIGN PATENT DOCUMENTS

| EP | 1793294 A1 | 6/2007 | ........... G05B 19/418 |
| GB | 2329308 A | 3/1999 | ................ H04L 9/08 |
| WO | 2008/022606 A1 | 2/2008 | ............. G05B 19/05 |
| WO | 2009/100733 A1 | 8/2009 | ........... G05B 19/042 |
| WO | 2011/113651 A1 | 9/2011 | ........... G05B 19/042 |

* cited by examiner

FIG 4

| | | |
|---|---|---|
| BK | | |
| IP Address | 192.168.100.2 | |
| Syslog Server | 192.168.100.5 | |
| VPN PSK | my_VPN12! | |
| WSAN Join Key | Secret12345 | |
| WLAN PSK | Office-WLAN_key | |
| Control Server | cs2. mchk.siemens.com | |
| Control Server Key | cs_key | |
| Time | 15:43 | |
| Date | 17.02.2009 | |
| Port 1 | ▼ in (4..20mA) | |
| Port 2 | ▼ in (0..12V) | |
| Port 3 | ▼ out (0..5V) | |
| Port 4 | ▼ out (-12..+12V) | |
| | C | OK |

FIG 5

| | CK | SK |
|---|---|---|
| VPN PSK | my_VPN12! | |
| WSAN Join Key | Secret12345 | hTR8wydM0xk7HsWs |
| WLAN PSK | Office-WLAN_key | kXXn1e0oOS0vPYpR |
| Control Server Key | cs_key | vwpgRpx9BaMz4WXC |

Cancel  OK

FIG 6

Mk: wKjgPBf7db1lGpU0

CSK

| | CK | SK |
|---|---|---|
| VPN PSK | my_VPN12! | |
| WSAN Join Key | Secret12345 | |
| WLAN PSK | Office-WLAN_key | |
| Control Server Key | cs_key | |

Cancel  OK

METHOD AND DEVICE FOR PROVIDING AT LEAST ONE SECURE CRYPTOGRAPHIC KEY

CROSS-REFERENCE TO RELATED APPLICATIONS

This application is a U.S. National Stage Application of International Application No. PCT/EP2011/052097 filed Feb. 14, 2011, which designates the United States of America, and claims priority to DE Patent Application No. 10 2010 011 657.2 filed Mar. 17, 2010. The contents of which are hereby incorporated by reference in their entirety.

TECHNICAL FIELD

This disclosure relates to a method and a device for providing at least one secure cryptographic key for performing a cryptographic security function by means of a control device.

BACKGROUND

In conventional automation networks, which can comprise a plurality of control devices for controlling components of an automation system, cryptographic keys are provided to the control devices for carrying out a cryptographic security function. Cryptographic keys of this type are frequently manually configured, that is, a value for the respective cryptographic key is input by means of an input mask. The cryptographic keys are included, for example, in a configuration file or are input via a configuration tool. The cryptographic security function which a cryptographic key offers depends on the length and entropy of the cryptographic key used. The longer the cryptographic key used and the higher the entropy thereof or the randomness of the characters used therein, the greater, in principle, is the strength of the cryptographic protective function achieved by the cryptographic key. For example, a long cryptographic key with a large number of special characters offers relatively high cryptographic protection.

A disadvantage of such long cryptographic keys which also use special characters is that said keys are difficult for the person inputting the cryptographic key to memorize and that the input of the cryptographic key also takes a relatively long time. Therefore, in many cases, despite the low protective effect provided by a short key with low entropy, short keys which are easily memorized and usually have low entropy are nevertheless used for a variety of cryptographic security functions. This applies, in particular, to technicians who undertake manual configurations on control devices of an automation network. If the system requires the input of strong or long keys with many special characters, many users also tend to note down in writing on pieces of paper cryptographic keys that are difficult to memorize in order to read them again and, for example, to input them into an input mask. In the case of long cryptographic keys or passwords having high entropy or randomness in the characters used, faulty input or incorrect typing often occurs when the cryptographic keys or passwords are input.

SUMMARY

In one embodiment, a device is provided for providing at least one secure cryptographic key for performing a cryptographic security function by means of a control device which requests a cryptographic key therefore, wherein a configured key provided for the security function is read out from a first configuration memory and, using the read-out configured key, it is tested whether a secure replacement key associated with the read-out configured key is stored in a second configuration memory, said replacement key being provided in place of the configured key to the control device for performing the security function.

In a further embodiment, the control device comprises a calculation unit which performs the cryptographic security function in that data are encrypted or decrypted with the cryptographic key provided or that cryptographic checksums are calculated or checked. In a further embodiment, access to the first configuration memory and to the second configuration memory by a user takes place depending on access authorizations to the respective configuration memory store. In a further embodiment, access authorization to the second configuration memory exists only for a system administrator. In a further embodiment, a secure replacement key is automatically calculated for a security function by means of a key derivation function, depending on the configured key for the security function and a master key. In a further embodiment, a secure replacement key for a security function is entered in the second configuration memory by a user having an access authorization for access to the second configuration memory. In a further embodiment, if, for the configured key read out from the first configuration memory, no associated secure replacement key is stored in the second configuration memory the configured key is provided to the control device for performing the security function, or a suitable warning message is generated. In a further embodiment, a replacement key has a higher information entropy and/or a greater key length than a configured key. In a further embodiment, the configured key is entered by a user with access authorization for access to the first configuration memory for the security function of the control device. In a further embodiment, the control device is connected to an automation network of an automation system. In a further embodiment, a plurality of cryptographic security functions, for each of which at least one cryptographic key is used, can be performed by the control device. In a further embodiment, for the project planning, construction, maintenance and operation of the automation system, different safety requirements are provided for the cryptographic keys used by the control devices of the automation system for performing security functions. In a further embodiment, it is tested whether the cryptographic key provided to the control device for performing the respective security function is sufficient for a temporary security requirement of the automation system.

In another embodiment, a method is provided for providing a secure cryptographic key for performing a cryptographic security function by means of a control device which requests a cryptographic key therefore, wherein a configured key provided for the security function is read out from a first configuration memory and using the read-out configured key, it is tested whether a secure replacement key associated with the read-out configured key is stored in a second configuration memory, said replacement key being provided, in place of the configured key, to the control device for performing the security function.

In another embodiment, an automation network comprising a plurality of control devices for controlling components of an automation system, wherein the control devices each receive at least one cryptographic key from a key preparation device connected to the respective control device for performing a cryptographic security function.

In a further embodiment, the components of the automation system controlled by the control devices comprise components of a production control system, in particular robot arms, welding robots, production actuators and production sensors, components of a traffic control system, components of an energy distribution control system, components of a transport control system, components of a process control system and components of an equipment control system.

BRIEF DESCRIPTION OF THE DRAWINGS

Example embodiments will be explained in more detail below with reference to FIGS., in which:

FIG. 4 is a diagram to illustrate a configuration interface to explain advantages of the device and the method according to some embodiments;

FIG. 5 is a diagram to illustrate a configuration interface according to a possible embodiment of the device and method for providing secure cryptographic keys;

FIG. 6 is a diagram to illustrate a configuration interface in a further embodiment of the device and method for providing secure cryptographic keys.

DETAILED DESCRIPTION

Figure 1:
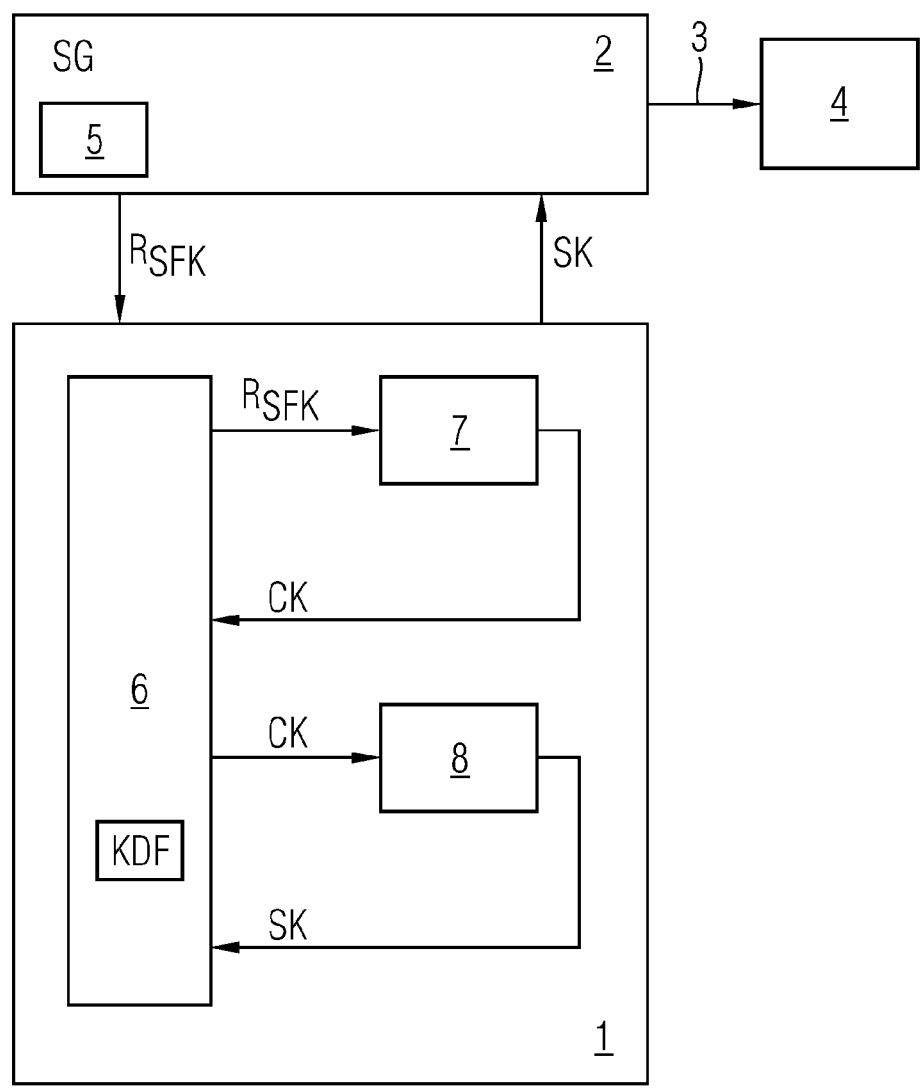
FIG. 1 is a block circuit diagram of a possible embodiment of the device for providing at least one secure cryptographic key.

Some embodiments provide a method and a device for providing a cryptographic key which, firstly enable simple usage of the cryptographic key and, secondly, do not impair the cryptographic protective function.

For example, some embodiments provide a device for providing at least one secure cryptographic key for performing a cryptographic security function by means of a control device which requests a cryptographic key therefor, wherein a configured key provided for the security function is read out from a first configuration memory and, using the read-out configured key, it is tested whether a secure replacement key associated with the read-out configured key is stored in a second configuration memory, said replacement key being provided in place of the configured key to the control device for performing the security function.

The cryptographic keys can be an arbitrary sequence of characters comprising digits, letters and special characters, and can, in particular, also be passwords.

In one embodiment of the device, the control device comprises a calculation unit which performs the cryptographic security function in that data are encrypted or decrypted with the cryptographic key provided or cryptographic checksums are calculated or checked.

In another embodiment of the device, access to the first configuration memory and to the second configuration memory by a user takes place depending on access authorizations to the respective configuration memory store.

In a possible embodiment of the device, an access authorization to the second configuration memory exists only for a system administrator.

In another possible embodiment of the device, a secure replacement key is automatically calculated for a security function by means of a key derivation function KDF, depending on the key configured for the security function and a master key.

In another embodiment of the device, a secure replacement key for a security function is entered in the second configuration memory by a user having access authorization for access to the second configuration memory.

In another embodiment of the device, the configured key is provided to the control device for performing the security function, wherein a suitable warning message is generated if, for the configured key read out from the first configuration memory, no associated secure replacement key is stored in the second configuration memory.

In another embodiment of the device, the replacement key has a higher information entropy and/or a greater key length than an associated configured key.

In another embodiment of the device, the configured key is entered by a user with access authorization for access to the first configuration memory for the security function of the control device.

In a possible embodiment of the device, the control device is connected to an automation network of an automation system.

In another embodiment of the device, a plurality of cryptographic security functions, for each of which at least one cryptographic key is used, can be performed by the control device.

In another embodiment of the device, for the project planning, construction, maintenance and operation of the automation system, different safety requirements are provided by the cryptographic keys used by the control devices of the automation system for performing security functions.

In a possible embodiment of the device, it is tested whether the cryptographic key provided to the control device for performing the respective security function is sufficient for a temporary security requirement of the automation system.

Other embodiments provide a method for providing a secure cryptographic key as disclosed herein.

Other embodiments provide a method for providing a secure cryptographic key for performing a cryptographic security function by means of a control device which requests a cryptographic key therefor, wherein a configured key provided for the security function is read out from a first configuration memory and using the read-out configured key, it is tested whether a secure replacement key associated with the read-out configured key is stored in a second configuration memory, said replacement key being provided in place of the configured key to the control device for performing the security function.

Other embodiments provide an automation network having a plurality of control devices comprising the features disclosed herein.

For example, some embodiments provide an automation network having a plurality of control devices for controlling components of an automation system, wherein, for performing a cryptographic security function, the control devices each receive at least one cryptographic key from a key preparation device associated with each control device, wherein the key preparation device provides at least one secure cryptographic key for performing a cryptographic security function by means of a control device which requests a cryptographic key therefor, wherein a configured key provided for the security function is read out from a first configuration memory and, using the read-out configured key, it is tested whether a secure replacement key associated with the read-out configured key is stored in a second configuration memory, said replacement key being provided, in place of the configured key, to the control device for performing the security function.

In an embodiment of the automation network, the components of the automation system controlled by the control devices comprise components of a production control system, in particular robot arms, welding robots, production actuators and production sensors, as well as components of a traffic control system, components of an energy distribution control system, components of a transport control system, components of a process control system and components of an equipment control system.

As shown in FIG. 1, a device 1 according to an example embodiment for providing at least one secure cryptographic key can be connected to a control device 2. The control device 2 can perform and/or control a cryptographic security function SF. In order to perform the cryptographic security function SF, the control device 2 requires at least one cryptographic key SFK (security function key). The cryptographic key can be a sequence of characters, in particular digits, letters or special characters. The cryptographic key can also be a required password. In a possible embodiment for one or more control lines 3, the control device 2 can control a device or a component 4, for which the security function SF is performed. For this purpose, the controlled device or component 4 can comprise a calculation unit, for example a microprocessor or a cryptographic chip, in order to perform a security function dependent upon a cryptographic key SFK.

In a further possible embodiment, the control device 2, as shown in FIG. 1, has a calculation unit 5 which performs the cryptographic security function SF. This calculation unit 5 can also be a microprocessor or an application-specific integrated ASIC or chip.

The cryptographic security function SF is performed in that data are encoded or decoded with a cryptographic key provided. Alternatively, the cryptographic security function SF can also be configured in that a cryptographic checksum is calculated or checked. In a possible embodiment, an application program AP executed by the calculation unit 5 for performing a cryptographic security function SF or a cryptographic calculation requests a corresponding cryptographic key. As shown in FIG. 1, the control device 2 issues this request $R_{SFK}$ for a cryptographic key SFK for performing a security function SF via an interface with the key preparation device 1. The interface between the control device 2 and the device 1 can be a wireless or cable-connected interface. In a possible embodiment, the control device 2 is connected via a network to the device 1. The device 1 can be connected to a plurality of control devices 2. In a possible embodiment, the device 1 receives a message from the control device 2 in which a cryptographic key is requested. The message received via the interface is received by a unit 6.

As soon as the unit 6 has received the request message $R_{SFK}$ to request a security key from the control device 2, said unit reads a key CK for the respective security function SF from a first configuration memory 7, as shown in FIG. 1. Using the read-out configured key CK, it is then tested by the unit 6 whether a secure replacement key SK associated with the read-out configured key CK is stored in a second configuration memory 8. If this is the case, the associated secure replacement key SK is read out from the second configuration memory 8 and, in place of the configured key CK for performing the security function SF, is made available to the control device 2 via the interface as a key SK. The two cryptographic configuration memory stores 7, 8 can be two separate memory segments of the same data memory.

In one embodiment of the device 1, access to the first configuration memory 7 and to the second configuration memory 8 by a user, takes place dependent on access authorizations to the respective configuration memory stores 7, 8. In a possible embodiment, only a system administrator has an access authorization to the second configuration memory 8, in which the secure replacement keys SK associated with the configured keys CK are stored. The replacement key SK has, in each case, a higher information entropy and a greater key length than a configured key CK which is stored in the first configuration memory 7. The secure replacement key SK can therefore be a long, relatively complex cryptographic key with a large number of special characters that are difficult to memorize and can offer a high level of cryptographic protection.

In a possible embodiment, the configured key CK, which is stored in the first configuration memory 7, can be entered via a user interface of the device 1 by a user A with access authorization for access to the first configuration memory 7 for a respective security function SF of a control device 2. Via said user interface, in a possible embodiment, the associated secure replacement key SK can also be entered into the second configuration memory 8 by another user B with access authorization for access to the second configuration memory 8. This user B can be, for example, a system administrator with access authorization for the second configuration memory 8.

In a possible embodiment, the configured key CK is configured via a first configuration interface and the second associated replacement key SK is configured via a second configuration interface. Access to the first configuration interface and to the second configuration interface can be subject to different restrictions or security controls. In a possible embodiment, a user who may undertake the configuration setting at the first configuration interface cannot use or call up the second configuration interface or vice versa. In a possible embodiment, further configurations can possibly be carried out via the first configuration interface. In another possible configuration, the second configuration interface is configured such that said interface enables only the configuration of the key value or of the secure replacement key SK. In this way, a security administrator can obtain access to the second configuration memory 8 without having to know the other configuration settings.

In a possible embodiment, if, for the configured key CK read out from the first configuration memory 7, no associated secure replacement key SK is stored or is present in the second configuration memory 8, the configured key CK is provided to the control device 2 for performing the security function SF. Alternatively or additionally, the device 1 can issue to the control device 2 a suitable warning that no associated secure replacement key SK is present.

In a possible embodiment, the secure replacement key SK for a security function SF is automatically calculated with a master key MK by means of a key derivation function KDF depending on the configured key CK for the security function SF. In this embodiment, the secure replacement keys SK are not entered into the second configuration memory 8, but are automatically calculated by a calculation unit by means of a key derivation function KDF and are written into the second configuration memory 8. As shown in FIG. 1, the key derivation function KDF can be stored in an internal memory of the unit 6. In this embodiment, a master key or master replacement key MK is entered via the second configuration interface with which key, by means of the key derivation function KDF, a key value for the secure replacement key SK is derived. For example, a HMAC function, in particular a HMAC-SHA1 (master key, first key value), can be used as the key derivation function KDF. In a further variant, the key value for the secure replacement key SK is calculated by means of a key derivation function KDF, dependent on both the respectively input key values, in particular HMAC-SHA1 (first key value, second key value). The first key value is the key value configured by means of the first configuration interface and the second key value is the key value configured by means of the second configuration interface. In a possible embodiment, the key derivation function KDF can be configured or temporally changed. In another possible embodiment, a plurality of secure replacement keys SK is provided in the second configuration memory 8 for each configured key CK. In another possible embodiment, said different secure replacement keys SK kept in reserve are made available or provided to the control device 2 in sequence on every request $R_{SFK}$ for a security function SF. In this way, on multiple execution of a security function SF, the control device 2 always receives a different or newer secure replacement key SK. In another possible embodiment with different key derivation functions KDF, these different secure replacement keys SK can be automatically derived from a master key MK.

In another possible embodiment, the secure replacement keys SK are stored in the configuration memory 8 as soon as a request $R_{SFK}$ for performing a security function is received. In an alternative embodiment, the secure replacement keys SK are only generated following receipt of a request $R_{SFK}$.

In the embodiment shown in FIG. 1, the control device 2 and the device 1 communicate via an interface. In an alternative embodiment, the device 1 for providing a secure cryptographic key for performing the cryptographic security function SF by the control device 2 can also be integrated into the control device 2. In another possible embodiment, the device 1 is insertable via an interface into the control device 2. As shown in FIG. 1, the control device 2 can control a device or a component 4 or, in a further variant, a plurality of components 4. The control device 2 can also be integrated into the component 4 to be controlled. The component 4 to be controlled can be a component of an automation system.

The component 4 can be a component of a production control system, in particular, a robot arm to be controlled, a welding robot, production actuators and production sensors. The component 4 can also be a component of a traffic control system, a component of an energy distribution control system, a component of a transport control system, a component of a process control system or a component of an equipment control system.

The device 1 for providing a secure cryptographic key 1 can be a firmly installed device or a mobile device which communicates via a wireless interface with the control device 2. The control device 2 can be a networked industrial control device, for example a 802.1ae/af MACSEC, IPsec, SSL/TLS, WLAN, 802.15.4, ZigBee, Bluetooth or wireless HART device. The control device 2 can be connected to a network of an automation system. The control device 2 can perform a plurality of cryptographic security functions SF which are used for the at least one cryptographic key SFK in each case. In another possible embodiment, it is also tested whether the cryptographic key SFK, that is, the secure replacement key SK, provided to the control device 2 by the device 1, for performing the respective security function SF, is sufficient for a temporary security requirement of the automation system. For different phases P of an automation system, such as the project planning, construction, maintenance and operation of the automation system, different security requirements can be provided by the cryptographic keys used by the control devices 2 of the automation system for performing security functions. For example, on construction of an automation system, a lower security requirement can be provided than during the actual operation of the automation system, since operation is usually more security-critical than the construction of the automation system. If the key provided is not sufficient for the cryptographic security requirements (e.g. minimum length, presence of special characters, digits, upper case and lower case letters), in another possible embodiment, the control device 2 can issue a further request R to the device 1. Said device then provides a secure replacement key SK which meets the given security requirements, for example, in that another key derivation function KDF is used for deriving the secure replacement key SK. In another possible embodiment, for a configured key CK, a plurality of secure replacement keys SK which meet the different security requirements of security requirement levels can be stored in the second configuration memory 8.

Figure 2:
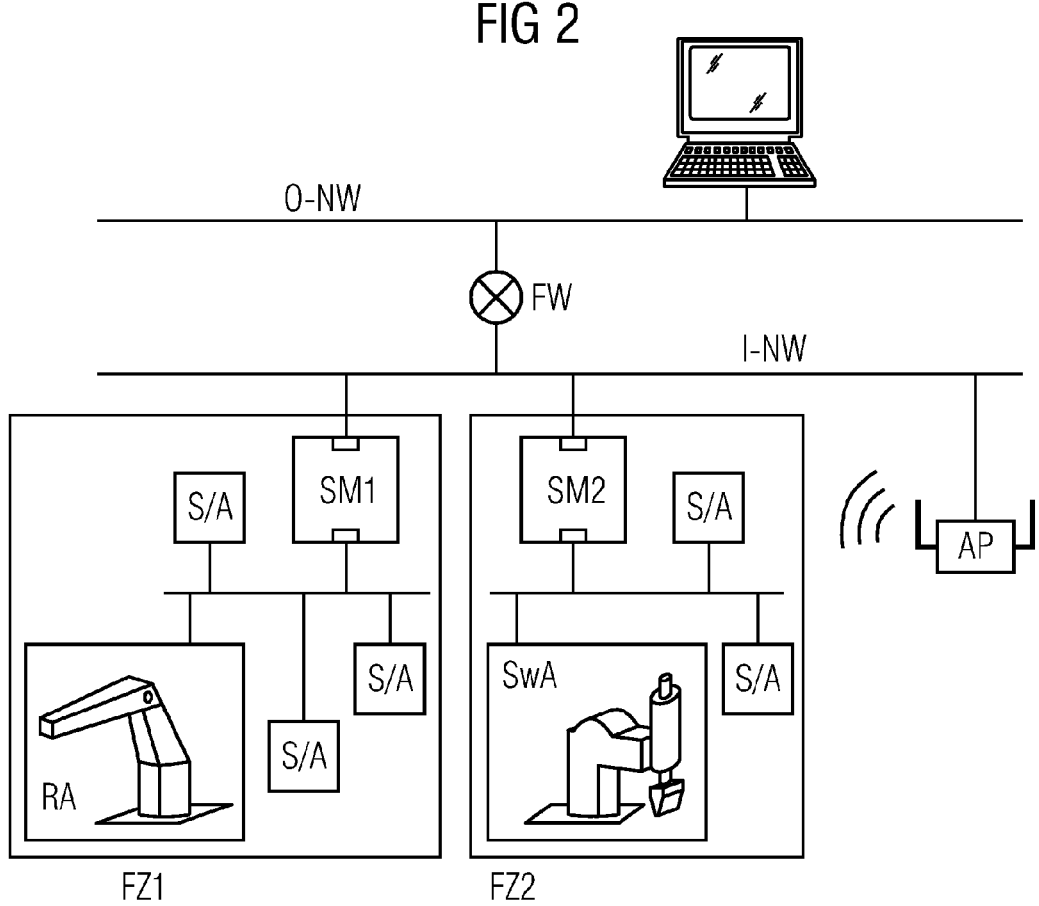
FIG. 2 is an example of an automation network comprising a plurality of control devices for actuating components of an automation system.

FIG. 2 shows an example of an automation network with a plurality of control devices for controlling components of an automation system, wherein the device and method for providing at least one secure cryptographic key for performing cryptographic security functions SF can be used. In the example shown in FIG. 2, an office or office network O-NW is connected, via a firewall FW, to an industrial network I-NW which, in the example shown, has two production cells FZ1, FZ2. Furthermore, an access point AP is provided at the industrial network I-NW. The two production cells FZ1, FZ2 each have a security module SM1, SM2 for protecting the respective production cell FZ. The two production cells FZ1, FZ2 each have a local bus which connects a plurality of sensors/actuators S/A to the robot arm RA or an automatic welding system SWA. The robot arm RA, the production cell FZ1 and the automatic welding system SWA in the production cell FZ2 and the security module SM, for example, the security gateway and the sensors or actuators represent components 4 which are controllable by a control device 2, as shown in FIG. 1, or comprise an integrated control device 2. Said components 4 of the automation network are to be partially configured, and said configuration can be carried out via a configuration computer which can be directly connected to the respective components 4. In an alternative embodiment, the configuration of one component 4 is carried out by a configuration computer connected to a network, which is also designated the project planning computer. Furthermore, remote access to a configuration computer present in the industrial network I-NW or in the office network O-NW is possible.

Figure 3:
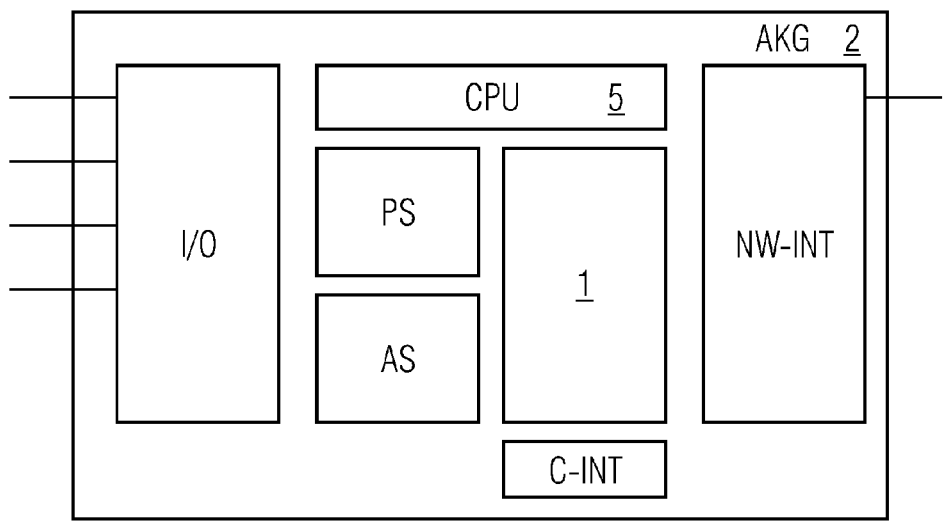
FIG. 3 is a block circuit diagram of an automation communication device provided for the automation network of FIG. 2 and having a device for providing a cryptographic key.

FIG. 3 shows a block circuit diagram of a possible embodiment of a control device 2. This control device 2 is an automation communication device AKG which can be connected via a network interface NW-INT to the automation network. The automation communication device AKG has a microprocessor or a communications processor CPU. The automation communication device AKG can also comprise an input/output unit I/O, by means of which, for example, sensors or actuators can be connected to the automation communication device AKG. The CPU can execute a program which is stored in a program memory PS and access data which are stored in a working memory AS. In one possible embodiment, the automation communication device AKG comprises a control device 2 for controlling an arbitrary component 4 within the automation network. In the embodiment shown in FIG. 3, the control device 2 contains an integrated device 1 for providing a secure cryptographic key for performing a cryptographic security function SF by the control device 2. In another possible embodiment, the control device 2 comprises a configuration interface C-INT. Arranged in the device 1 are a first configuration memory 7 and a second configuration memory 8. Stored in the first configuration memory 7 is a configured key CK for the security function SF. Stored in the second configuration memory 8 is at least one secure replacement key SK associated with the configured key CK. If, for a cryptographic security function SF, the CPU or the calculation unit 5 of the control device 2 performs, for example, an encryption of data or a calculation of a cryptographic checksum for a component 4 of the automation network, said CPU can request a corresponding cryptographic key from the device 1. A configured key CK provided for the security function SF is read out from the first configuration memory 7 of the device 1 and, using the configured key CK read out, it is tested whether a secure replacement key SK associated with the read-out configured key CK is stored in the second configuration memory 8. If this is the case, the secure replacement key SK is read out from the second configuration memory 8 and the CPU or the calculation unit 5 of the automation communication device 2 or the control device 2, in place of the configured key CK for performing the security function SF of the control device 2.

In another possible embodiment, access to the two configuration memory stores 7, 8 takes place via the configuration interface C-INT. The access to both configuration memory stores 7, 8 can take place depending on different access authorizations. In another possible embodiment, only one system administrator has access authorization to the second configuration memory 8 within the key preparation device 1.

FIG. 4 shows a diagram to illustrate a first configuration interface for inputting an operational configuration BK which comprises a plurality of configured keys CK. In the example shown, a configuration can be undertaken via an input mask wherein, alongside other parameters such as IP addresses, time and date input as well as port settings, configured keys CK, in particular for security functions SF, can be input. For example, a WSAN Join Key, a WLAN PSK (pre-shared key) and a control server key are input into the key preparation device 1 by means of the configuration interface shown in FIG. 4. The input can be performed, for example, manually by a user on site. The configured keys CK input via the mask according to FIG. 4 can be stored, for example, in the first configuration memory 7 of the device 1. The keys CK can be, for example, weak keys with a short key length which are easier to memorize, particularly for technicians who move about within the automation system. For example, therefore, during commissioning of an automation system, said system can be operated with simple readily configured keys CK. Only when the system is brought into operational service at a later time point, are strong replacement keys SK configured and used.

FIG. 5 shows a diagram to illustrate a further input mask for the configuration interface in the key preparation device 1 according to one embodiment. This input mask can provide a replacement key field for every configured key CK, in which a secure replacement key SK can be input. In one embodiment, only one user with special access rights, in particular a security administrator of the network has access to the input mask shown in FIG. 5. For each simple configured key CK, the user or security administrator can input an associated secure replacement key SK. As shown in FIG. 5, the replacement key SK may have a higher information entropy and a greater key length than the associated configured normal operational key CK. The configured key CK is usually a simple, short, easily memorized cryptographic key, whereas the associated replacement key SK is a relatively long complex cryptographic key which has a plurality of special characters and is relatively difficult to memorize. In another possible embodiment, the configured operational key CK is input by a first user A, for example, a technician who installs and commissions the automation system, and the more secure replacement key SK is input by a second user B, in particular a security administrator with special access rights. The configured replacement key SK is not recognizable by the first user A and, in many cases, the first user A does not know of the existence of the associated configured security key SK. In a possible embodiment, input of the operational key or the configured simple key CK is carried out by a user A who is, for example, a technician, on site, at the respective control device 2 via a corresponding configuration interface. In a possible embodiment, the associated security key or replacement key SK is input by a second user B, for example a security administrator, not locally at the control device 2, but remotely at a remote terminal connected to the control device 2 via a network. User A, who is, for example, a technician for commissioning the system, therefore does not need to know and configure the strong replacement key, but nevertheless can install and commission the automation system.

In the example shown in FIG. 5, for three of the four configured keys CK shown, an associated replacement key SK must be input by a system administrator. For one security function SF, specifically VPN PSK, in the example shown, no associated secure replacement key SK is input into the corresponding field. In a possible embodiment, in the event that for the configured key CK stored in the first configuration memory 7, no associated secure replacement key SK is stored in the second configuration memory 8, the configured key CK is provided to the respective control device 2 for performing the security function SF. In the example shown in FIG. 5, therefore, the configured key CK "my_VPN12!" is provided to the control device 2 for performing the security function SF, since no corresponding replacement key SK is present. In a possible embodiment, a user additionally receives a corresponding acoustic or visual warning. For example, a system administrator may receive a message that a cryptographic key for a security function is requested, although no associated secure replacement key SK is defined.

FIG. 6 shows a further input mask of a configuration interface of the key preparation device 1 according to one embodiment. In this embodiment, a system administrator does not input an associated replacement key SK for each normally configured key CK, but only one master key MK. The system administrator can, for example, cause an associated secure replacement key SK to be calculated or generated automatically from a master key MK by means of a key derivation function KDF for the configured keys CK by clicking on a switch surface on the mask. Said secure replacement keys are then shown in the associated replacement key field. In a possible embodiment, the system administrator can then further process the derived secure replacement keys SK. In this embodiment, the replacement key SK is automatically calculated or derived with a key derivation function KDF depending on the configured key CK and the master key MK. An advantage of the embodiment shown in FIG. 6 consists therein that the system administrator has to spend less time in administering the various keys.

Figure 7:
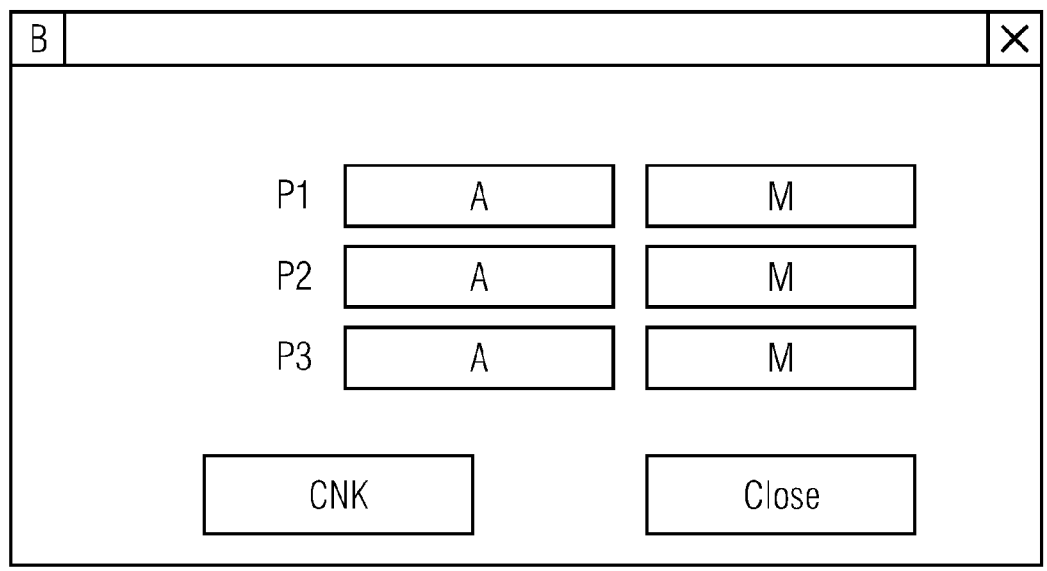
FIG. 7 is a diagram to illustrate a configuration interface in a further embodiment of the device and method for providing secure cryptographic keys.

FIG. 7 shows a diagram to illustrate a further embodiment of the configuration interface in the device 1 according to one embodiment for providing secure cryptographic keys. With the embodiment shown in FIG. 7, different keys are provided for different phases P of the automation system. In the example shown, for the phases P of project planning PI, servicing P2 and operation P3, different cryptographic keys K are activated (A) or modified (M). Furthermore, the system administrator has the possibility of creating a new set of cryptographic keys K for the respective phase P of the automation system. It is possible to store a plurality of key replacement configurations (CNK: create new keys). Depending on an operating mode, a corresponding key configuration can be selected and activated manually or automatically. For example, for construction or maintenance of the automation system, it is possible to work with relatively weak cryptographic keys, particularly short, easily memorized keys which may also be known to a wide circle of personnel. Said keys can then be replaced at a later time point when the automation system is transferred to the operational state, with strong or secure replacement keys SK by a system security administrator. In said embodiment, the cryptographic keys which are made known to the construction personnel and the maintenance personnel are not the cryptographic keys which are put into operational use later. In this way, it can be prevented that cryptographic keys accidentally coming into the wrong hands could later be used during operational running of the automation system and used for security functions of the automation system. Furthermore, during construction and maintenance of the automation system, the personnel must not work with complex cryptographic keys which are difficult to memorize. The device 1 and the method may be suitable not only for providing secure cryptographic keys, but also for providing secure passwords, for example, in the authentication and/or authorization of a user in relation to the system.

In a possible embodiment, after carrying out a security function SF, a new replacement key is automatically derived or calculated. The method and the device 1 may be versatile in application. The key preparation device 1 may be suitable not only for control devices 2 of a production control system, but also for other controllable components or devices, particularly in the field of traffic control, energy distribution control, transport control, process automation and equipment control. In a possible embodiment, the provision of the cryptographic keys and the performance of the cryptographic security function SF is carried out in real time by the device 1 as disclosed herein.

What is claimed is:

1. A device for providing at least one secure cryptographic key to a control device for performing a cryptographic security function, the device comprising:
 a first configuration memory storing a configured key provided for the security function, and
 a processor configured to:
 receive from the control device a request for a cryptographic key for performing the cryptographic security function,
 read the configured key from the first configuration memory,
 based on the read-out configured key, determine whether or not a secure replacement key associated with the read-out configured key is stored in a second configuration memory,
 if it is determined that no secure replacement key associated with the read-out configured key is identified in the second configuration memory, providing the configured key to the control device for performing the cryptographic security function, and
 if it is determined that a secure replacement key associated with the read-out configured key is identified in the second configuration memory, providing the secure replacement key to the control device instead of the configured key,
 wherein the control device is connected to an automation network of an automation system, and
 wherein for a plurality of different phases of the automation system, different safety requirements are provided for cryptographic keys used by the control device for performing respective security functions of the automation system.

2. The device of claim 1, wherein the secure replacement key is used by a calculation unit of the control device for data encryption or decryption, or for calculating or checking cryptographic checksums.

3. The device of claim 1, wherein access to the first configuration memory and to the second configuration memory by a user is controlled based on access authorizations to the respective configuration memory store.

4. The device of claim 3, wherein access authorization to the second configuration memory exists only for a system administrator.

5. The device of claim 1, wherein the processor is configured to execute a key derivation function to automatically calculate the secure replacement key based on the read-out configured key and a master key.

6. The device of claim 1, wherein the secure replacement key is stored in the second configuration memory by a user having an access authorization for access to the second configuration memory.

7. The device of claim 1, wherein the secure replacement key has at least one of a higher information entropy and a greater key length than the configured key.

8. The device of claim 1, wherein the configured key is entered by a user with access authorization for access to the first configuration memory for the security function of the control device.

9. The device of claim 1, wherein a plurality of cryptographic security functions, for each of which at least one cryptographic key is used, can be performed by the control device.

10. The device of claim 1, wherein the plurality of different phases of the automation system include a project planning phase a construction phase, a maintenance phase, and an operation phase of the automation system.

11. The device of claim 10, wherein it is tested whether the cryptographic key provided to the control device for performing the respective security function is sufficient for a temporary security requirement of the automation system.

12. A method for providing a secure cryptographic key to a control device for performing a cryptographic security function, comprising: the control device requesting from a key management device a secure cryptographic key for performing the cryptographic security function, a processor of the key management device receiving from the control device the request for a cryptographic key for performing the cryptographic security function, the processor of the key management device reading from a first configuration memory a configured key associated with the cryptographic security function, the processor of the key management device determining whether or not a secure replacement key associated with the read-out configured key is stored in a second configuration memory, and if it is determined that no secure replacement key associated with the read-out configured key is identified in the second configuration memory, the processor of the key management device providing the configured key to the control device, and if it is determined that a secure replacement key associated with the read-out configured key is identified in the second configuration memory, the processor of the key management device providing the secure replacement key to the control device instead of the configured key, wherein the control device is connected to an automation network of an automation system, and wherein for a plurality of different phases of the automation system, different safety requirements are provided for cryptographic keys used by the control device for performing respective security functions of the automation system.

13. An automation network comprising:
at least one control device for controlling one or more components of an automation system, at least one key preparation device configured to provide cryptographic keys to the at least one control device, wherein a particular key preparation device comprises: a first configuration memory storing a configured key associated with a particular cryptographic security function of a particular one of the control devices, and a processor configured to: receive from the particular one of the control devices a request for a cryptographic key for performing the particular cryptographic security function, read the configured key from the first configuration memory, based on the read-out configured key, determine whether or not a secure replacement key associated with the read-out configured key is stored in a second configuration memory, if it is determined that no secure replacement key associated with the read-out configured key is identified in the second configuration memory, providing the configured key to the particular one of the control devices, and if it is determined that a secure replacement key associated with the read-out configured key is identified in the second configuration memory, providing the secure replacement key to the particular one of the control devices instead of the configured key, wherein for a plurality of different phases of the automation system, different safety requirements are provided for cryptographic keys used by the at least one control device of the automation network for performing respective security functions of the automation system.

14. The automation network of claim 13, wherein the components of the automation system controlled by the one or more control devices comprise at least one of robot arms, welding robots, production actuators and production sensors, components of a traffic control system, components of an energy distribution control system, components of a transport control system, components of a process control system, and components of an equipment control system.

15. The device of claim 1, wherein if no secure replacement key associated with the read-out configured key is identified in the second configuration memory, the processor is configured to generate a suitable warning message.

16. The automation network of claim 13, wherein the particular control device includes a calculation unit configured to use the secure replacement key received from the particular key preparation device data encryption or decryption, or for calculating or checking cryptographic checksums.

17. A method for providing secure cryptographic keys to an automation system for performing respective cryptographic security functions for a plurality of different phases or operations of the automation system, the method comprising: a security control device coupled to the automation system requesting from a key management device a secure cryptographic key for performing a cryptographic security function for a first phase or operation of the automation system, a processor of the key management device receiving from the security control device the request for a cryptographic key for performing the cryptographic security function for the first phase or operation of the automation system, the processor of the key management device reading from a first configuration memory a configured key providing a first level of security and providing the configured key to the security control device in a first response, transferring to a second phase or operation of the automation system, the security control device coupled to the automation system requesting from a key management device a secure cryptographic key for performing a cryptographic security function for the second phase or operation of the automation system, the processor of the key management device receiving from the control device the request for a cryptographic key for performing the cryptographic security function for the second phase or operation of the automation system, and the processor of the key management device reading from the first configuration memory a configured key providing the first level of security, and providing the configured key to the security control device in a second response, the security control device determining that the configured key provided in the second response provides insufficient security for the cryptographic security function for the second phase or operation of the automation system, and requesting from the key management device a replacement key having a second level of security higher than the first level of security, and in response to receiving the request for the replacement key, the processor of the key management device automatically accessing or deriving from a second configuration memory a replacement key providing the a second, higher level of security.

* * * * *